(12) United States Patent
Gruber et al.

(10) Patent No.: US 8,439,985 B2
(45) Date of Patent: May 14, 2013

(54) METHOD FOR THE PRODUCTION OF A FUEL FROM VEGETABLE OIL

(75) Inventors: Georg Gruber, Hilpoltstein (DE); Thomas Kaiser, Denkendorf (DE); Alois Dotzer, Allersberg (DE)

(73) Assignee: Waldland-Vermarktungsgesellschaft m.b.H., Friedersbach (DE)

( * ) Notice: Subject to any disclaimer, the term of this patent is extended or adjusted under 35 U.S.C. 154(b) by 630 days.

(21) Appl. No.: 12/448,537

(22) PCT Filed: Dec. 23, 2007

(86) PCT No.: PCT/EP2007/011419
§ 371 (c)(1),
(2), (4) Date: Jun. 24, 2009

(87) PCT Pub. No.: WO2008/080600
PCT Pub. Date: Jul. 10, 2008

(65) Prior Publication Data
US 2010/0077652 A1     Apr. 1, 2010

(30) Foreign Application Priority Data
Dec. 27, 2006   (DE) .......................... 10 2006 061 604

(51) Int. Cl.
*C10L 1/00*     (2006.01)

(52) U.S. Cl.
USPC ............................................................ 44/307

(58) Field of Classification Search ...... 435/262; 44/307
See application file for complete search history.

(56) References Cited

U.S. PATENT DOCUMENTS
6,423,531 B1 * 7/2002 Hince et al. ............... 435/262

FOREIGN PATENT DOCUMENTS
| EP | 0376406 | * | 7/1990 |
| EP | 0507217 | * | 10/1992 |
| EP | 1741767 | * | 1/2007 |
| WO | WO0220705 | * | 3/2002 |

* cited by examiner

*Primary Examiner* — James Goloboy
*Assistant Examiner* — Chantel Graham
(74) *Attorney, Agent, or Firm* — Karl F. Milde, Jr.; Eckert Seamans Cherin & Mellott, LLC

(57) ABSTRACT

The invention relates to a method for producing a fuel from vegetable oil in order to operate of diesel internal combustion engines. In said method, the oleaginous fruit is pressed, and the dripping oil is filtered. According to the invention, the dripping vegetable oil containing the cloudy matter is mixed with a clay material in a first step before being filtered and is filtered in a second step.

17 Claims, 1 Drawing Sheet

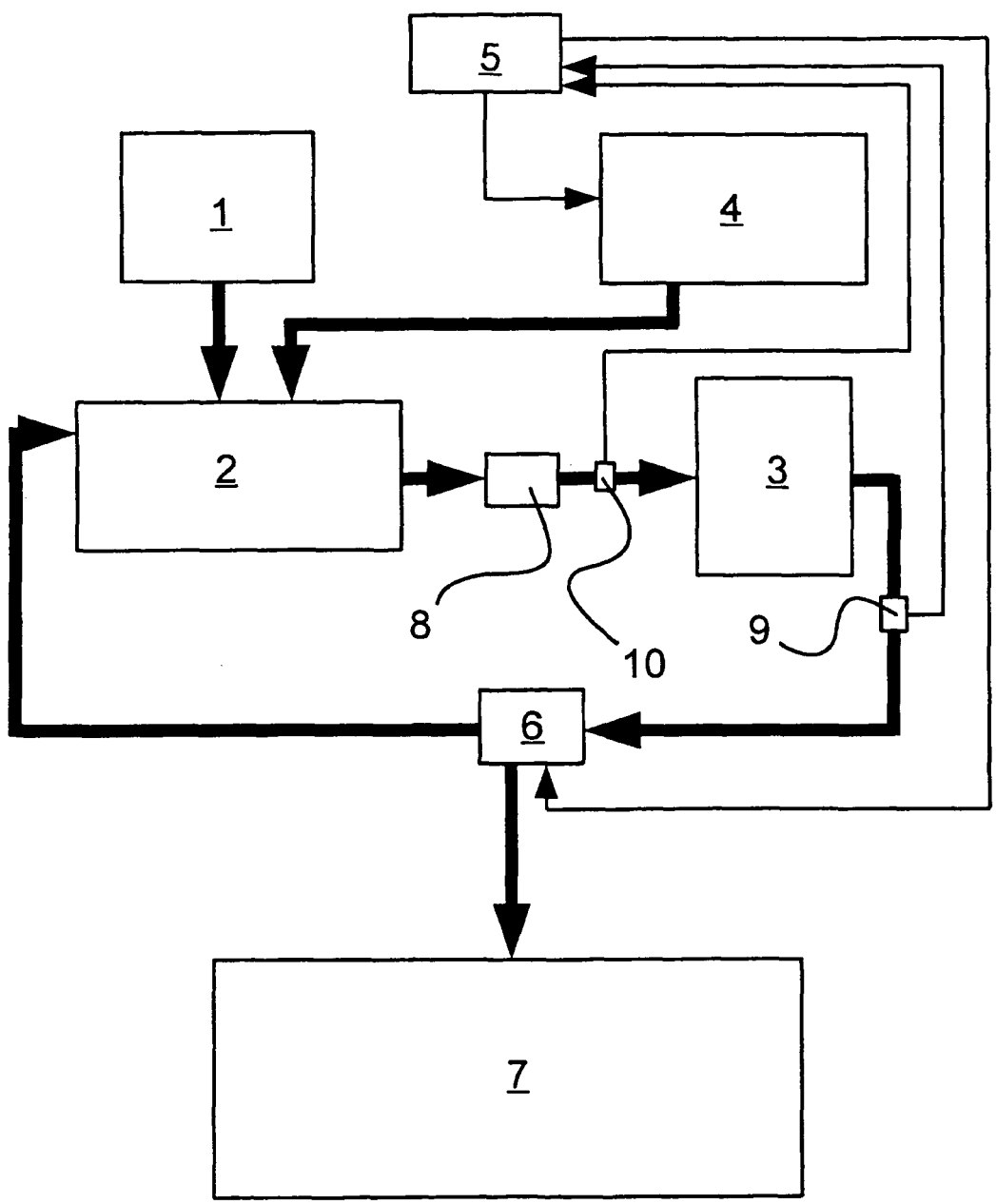

METHOD FOR THE PRODUCTION OF A FUEL FROM VEGETABLE OIL

CROSS-REFERENCE TO RELATED APPLICATION

The subject matter of this application is related to that of the applicants' U.S. patent application Ser. No. 12/448,506 filed Jun. 23, 2009.

BACKGROUND OF THE INVENTION

The invention relates to a method for the production of fuel from vegetable oil for operating diesel combustion engines.

Diesel combustion engines for passenger cars and in particular for trucks that can be operated purely on vegetable oil are now available. Commercially available series engines are converted for operation with vegetable oil to achieve this purpose. The engines converted in this manner are operated either with cold-pressed vegetable oils from decentralized oil mills or with so-called fully refined oils originating from interregional extraction plants.

By now, a network of about 500 decentralized oil mills has been established in Germany for the production of cold-pressed vegetable oil. These oil mills process approximately 10% of the national rape oilseed production. The vegetable oil produced by these oil mills typically exhibits a phosphorus content of between 5 and 30 ppm, or between 5 and 30 mg/kg of vegetable oil when expressed as a proportion of weight. The sum of the magnesium and calcium content is typically between 10 and 30 ppm.

The fully refined oil mentioned above is a vegetable oil that has typically been extracted from ground up fruits using hexane. The interim product occurring during the extraction is filtered, degummed and bleached. The final product has a phosphorus content of less than 5 ppm. Good fully refined oils have a phosphorus content of between 1 and 3 ppm and a combined calcium-magnesium value of between 1 and 3 ppm as well. Because the so-called fully refined oils are used mostly in the food industry, there are no regulations with regard to maximum values for phosphorus, calcium and magnesium.

Analyses for specifying phosphorus, calcium and magnesium contents of vegetable oils used as fuel have by now led to a pre-standard of the Deutsches Institut für Normung [German Institute for Standards]. This DIN pre-standard DINV 51605 specifies the maximum content of these three substances in a fuel made of vegetable oil as follows:

Phosphorus: 12 ppm
Calcium+Magnesium: 20 ppm.

When operating engines using fuel according to this pre-standard, it became apparent that unexplainable incrustations often occur on the pistons, deposit themselves on the valve discs or the glow plugs, or block the catalytic converter in the exhaust, or plug up the soot filter. The exact operating conditions under which these deposits occur have thus far not been conclusively clarified.

The same phenomena occur with engines that are operated using rape methyl ester, the so-called biodiesel. Biodiesel is produced pursuant to the DIN standard DIN EN14214. This standard specifies the following maximum phosphorus, calcium and magnesium values:

Phosphorus: 10 mg/kg
Calcium+Magnesium: 5 mg/kg

To the extent that fully refined oils are manufactured by extraction plants not only for the food industry but also as fuel, the values for phosphorus, calcium and magnesium are steadily approaching the higher values according to the DIN pre-standard for vegetable oil as a fuel. This means that the phosphorus, calcium and magnesium content increases in instances when the fully refined oil is used as a fuel as opposed to its use in the food industry. This also leads to a cost advantage when the extraction rate is increased for fuel production or when purification efforts are decreased.

SUMMARY OF THE INVENTION

However, it has been found that a fuel made of vegetable oil that exhibits phosphorus, calcium and magnesium values significantly below the values of this pre-standard does not cause the described incrustations.

It is, therefore, the underlying objective of this invention to develop a method for the production of a fuel from vegetable oil such that the obtained fuel does not exceed a phosphorus content of 0.5 ppm. Similarly, the calcium and magnesium contents, respectively, shall not exceed values of 0.5 ppm. At the same time, the production shall not cause significantly higher costs than before. The method according to the invention shall be applicable by decentralized oil mills when producing cold pressed vegetable oil.

According to the invention, this objective is achieved by a method for producing a fuel from vegetable oil according to the features of Claim 1. By adding clay mineral to the vegetable oil in a first step prior to filtering, the oil still contains all trub substances from pressing. When filtering, these trub substances are deposited on the filter and are thus responsible for the actual filtering. To achieve a filter cake of an appropriate thickness, the vegetable oil that is to be filtered is circulated through the filter until the filter cake on the filter shows the desired filtering effect. Only then will the actual filtering process start according to which the filtered vegetable oil can be used as a fuel.

It has become apparent that the mixed-in clay mineral shows the highest effect when it is incorporated in the filter cake. In this manner, the vegetable oil is pressed at a high pressure past the uniformly distributed clay mineral particles during filtering. This allows the clay mineral to be effective with its entire surface area.

A higher pressing pressure can be used due to the surprisingly intensive removal of phosphate, calcium and magnesium. Typically, the content of phosphorus, calcium and magnesium increases at a higher pressing pressure. Naturally, the yield in pressed vegetable oil increases as well. By removing these substances when using the method subject to the invention, it is therefore possible to improve the quality of the fuel and at the same achieve a higher yield. This can almost compensate for the slight additional expenses due to the use of the clay mineral. The uniform distribution of the clay mineral in the filter cake is best achieved by mixing the vegetable oil that drains from the press together with the trub substances and the added clay mineral for a predetermined period. In the process, the clay mineral is mixed uniformly with the trub substances in the vegetable oil and can deposit uniformly during the filtration together with the trub substances on the filter surface.

Dependent on the variety of the pressed vegetable oil, a mixing time of between 20 and 60 minutes has proven to bring the best results. This means that a minimum retention time of 20 min should be maintained in a mixing vessel for the drained vegetable oil. A retention time of more than 60 minutes no longer improves the result; rather it leads to a longer processing time and worsens the cost-effectiveness of the method according to the invention.

With the varieties that are popular as fuel, it has been demonstrated that from both a qualitative and economic perspective an optimum is achieved when the drained vegetable oil is stirred for a period of 30 to 50 minutes after the addition of clay mineral and prior to filtering.

Because the viscosity of the vegetable oil increases with a decreasing temperature, mixing should occur at a temperature of no less than 20° C. The effectiveness of the clay material also increases above this temperature, thus necessitating only smaller amounts.

For rape seed oil, the mixture of drained vegetable oil and clay mineral is kept at a temperature of between 35 and 42° C. prior to the filtration. The best effects of the clay mineral are achieved in this temperature range, and at the same time harm to the vegetable oil through excessive temperatures can be excluded. Synthetic silica gel or amorphous silica can be used as the clay mineral. However, in a particularly advantageous manner, the clay mineral contains bentonite. As the most significant component, bentonite contains montmorillonite and exhibits a very large inner surface. At times, reference is made to 400-600 $m^2$ per gram. It is, therefore best suited as an adsorbent. Montmorillonites additionally exhibit a high ion exchange capacity because they are superbly capable of exchanging the cations between the layers of their three-layer structure for cations from the solutions to be treated.

Bentonite obtains an even greater inner surface when it is acid-activated. The inner surface is at least doubled.

Depending on the quality of the pressed vegetable oil, the clay mineral consumption will be between 0.25 and 10.00 percent in weight. The quality of the vegetable oil depends on the cultivation conditions of the oil vegetables (climate, soil, fertilization) and on the pressing conditions. In this case, the term quality refers to the contents of phosphorus, calcium and magnesium. However, the trub substance content in the drained vegetable oil plays a role as well.

When pressing rape seed using typical parameters, an addition of 1-3 percent in weight of clay mineral is generally sufficient. The quality gain for metering a higher addition would be in no reasonable relationship to the associated costs.

Advantageously, cellulosic additives are added to the vegetable oil that drains from the press to improve in particular the filtration effect. For example, sawdust may be used for this purpose.

Other so-called filtration aids are used as well. As an example, mention shall be made of diatomaceous earth or additives containing diatomaceous earth. It has been demonstrated that vegetable oil can be treated successfully using the method according to the invention when it exhibits a trub substance content of between 2 and 30 percent in weight. With low contents of trub substances, close mixing of the trub substances with the added clay mineral can no longer be ensured. Thus, the build-up of the filter cake will be irregular as well. This reduces significantly the effect of the clay mineral in removing phosphorus, calcium and magnesium from the vegetable oil. With a content of more than 30 percent in weight, the addition of clay mineral would have to be increased enormously to achieve an effective distribution in percent in the filter cake.

The best results are achieved when the press is set such that the trub substance portion in the draining vegetable oil is between 3 and 5 percent in weight. In this case, an excellent result can be achieved already with a very small addition of clay mineral.

In an advantageous manner, the amount of added clay mineral is made dependent on the trub substance content. It can be assumed that the clay mineral develops its effect primarily in the filter cake and only to a limited degree in the stirred oil. Thus, the buildup of the filter cake is the decisive factor. Because the filter cake builds up very fast when the trub substance content is high, a large amount of clay mineral must be added in order to achieve the corresponding composition of the filter cake.

For a full understanding of the present invention, reference should now be made to the following detailed description of the preferred embodiments of the invention as illustrated in the accompanying drawing.

BRIEF DESCRIPTION OF THE DRAWING

FIG. 1 shows a block diagram of the method according to the invention.

DESCRIPTION OF THE PREFERRED EMBODIMENT

The press 1 is typically designed as a screw press. A screw rotates within a cage that is formed of drainage bars that run parallel to the screw axis. As a rule, the oleaginous fruits do not require prior grinding because they are broken in the screw press to the extent that the oil can be pressed out.

The precise adjustment of the distance between the drainage bars is responsible for the content of trub substances in the drained vegetable oil. However, this content is not only a result of the design conditions of the press 1 but also of the water content of the oleaginous fruits. In any case, it is the objective to set the draining vegetable oil to a certain content of trub substances.

The vegetable oil runs into a collection and mixing vessel 2. There, it is stirred by a mixing paddle (not shown). Simultaneously, this prevents sedimentation of the trub substances in the collection and mixing vessel 2. The vegetable oil heats up during pressing and exhibits a temperature of between 35 and 42° C. in the collection and mixing vessel depending on the degree of pressing. At this temperature, the vegetable oil is of low viscosity and layers that would prevent a uniform distribution of the trub substances do not occur.

Clay mineral such as acid-activated bentonite is added via the metering device 4. The addition is governed by the content in trub substances in the collected vegetable oil. In the same manner, the content of phosphorus, calcium and magnesium after pressing needs to be considered. It is understood that heavily pressed oil exhibits a higher content of these substances than gently pressed oil.

The pump 8 extracts the oil from the collecting and mixing vessel 2 and presses it through the filter 3. The pressure present upstream of the filter 3 is determined by a pressure sensor 10 and is transmitted to the control device 5. The oil flowing from the filter 3 is checked using the optical sensor 9. This optical sensor 9 determines the content of trub substances, for example, via the transparency of the oil. From the filter 3, the oil arrives at the 3-way valve 6 and from there is returned to the collecting and mixing vessel 2 or delivered to the tank 7. The 3-way valve 6 is controlled by the control device 5.

The control device 5 determines the speed of the rise in pressure upstream of the filter 3 via the pressure sensor 10. The filter cake in the filter 3 builds up in proportion to the pressure increase. Thus, the rise in pressure is also a measure for the trub substance content in the oil in the collecting and mixing vessel 2. The metering device 4 is controlled in relation to the rise in pressure and a computed amount of clay mineral is added.

The control devices 5 checks the pressure upstream of the filter 3 continuously via the pressure sensor 10. As long as the pressure sensor 10 determines a value that is below a predetermined threshold value, the 3-way valve 6 is controlled such that the oil returns to the collecting and mixing vessel 2. In this manner, the oil circulates across the filter 3. The function of the circulation is to build-up a filter cake. The filter cake has the function of a high-grade filter and must, therefore, reach a thickness that ensures a sufficient filtration of the vegetable oil.

Only when the threshold value is exceeded at the pressure sensor 10, the transparency of the oil downstream of the filter 3 will be checked as well using the optical sensor 9. A threshold level for the transparency is stored in the control device 5 as well. If the transparency of the passing oil is greater than the stored threshold value, the control device 5 will toggle the 3-way valve 6. From this moment, oil is pumped into the tank 7.

Because the filter cake continues to build up, the pressure upstream of the filter 3 also continues to increase. Thus, a maximum value is stored in the control device 5. The filter 3 must be cleaned when this maximum value is reached. To accomplish this, the pump 8 is typically stopped and the filter 3 is dried using air. The dried filter cake is loosened by manual shaking or by automatic vibrations and is removed downwards. The process can then restart. Typically, the collecting and mixing vessel 2 is designed such that the draining oil can be stored temporarily during the cleaning period allowing the press 1 to continue operation even during the cleaning break.

A second filter parallel to the first filter can be provided as an alternative. Vegetable oil is fed alternating between the two filters such that the cleaning can be carried out continuously.

During the time when one of the filters is cleaned and a new filter cake builds up, the filtration of the vegetable oil is maintained by the parallel filter.

The following values were achieved for rape seed oil with trial pressings using the method according to the invention:

| Batch | P | Ca | Mg | Clay min | P | Ca | Mg |
|---|---|---|---|---|---|---|---|
| 1 | 6.56 ppm | 9.37 ppm | 1.5 ppm | 1% | <0.3 ppm | 1.24 ppm | <0.25 ppm |
| 2 | 6.89 ppm | 8.13 ppm | 1.6 ppm | 1% | <0.3 ppm | 1.19 ppm | <0.25 ppm |
| 3 | 6.89 ppm | 8.13 ppm | 1.6 ppm | 3% | <0.3 ppm | <0.5 ppm | <0.25 ppm |
| 4 | 46.7 ppm | 36.2 ppm | 13.8 ppm | 2% | <0.3 ppm | <0.5 ppm | <0.25 ppm |

Columns 2-4 include the phosphorus, calcium and magnesium contents, respectively, in the pressed vegetable oil in the collecting and mixing vessel 2. The information in column 5 refers to the addition of clay mineral to the vegetable oil in percent by weight. The information in columns 6-8 reflect the phosphorus, calcium and magnesium content, respectively, of the treated vegetable oil in tank 7. Some of the information in columns 6-8 indicates that the detection limits of the commissioned laboratory had been reached. Thus, it cannot be excluded that the actual values may be significantly below these values.

There has thus been shown and described a novel method for the production of a fuel from vegetable oil which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for producing a fuel from vegetable oil for operating diesel combustion engines, whereby the oleaginous fruits are pressed and the draining oil is filtered, said method comprising the steps of (a) adding clay mineral to the draining vegetable oil with the trub substances contained in it, and (b) filtering the draining vegetable oil through the trub substances mixed with clay.

2. A method as set forth in claim 1, wherein the draining vegetable oil is stirred for a pre-determined time after the addition of clay mineral and prior to filtering.

3. A method as set forth in claim 2, wherein the draining vegetable oil is stirred for a period of 20 to 60 minutes after the addition of clay mineral and prior to filtering.

4. A method as set forth in claim 3, wherein the draining vegetable oil is stirred for a period of 30 to 50 minutes after the addition of clay mineral and prior to filtering.

5. A method as set forth in claim 2, wherein the mixture of the draining vegetable oil and the clay mineral is kept at a temperature above 20° C. prior to filtering.

6. A method as set forth in claim 5, wherein the mixture of the draining vegetable oil and the clay mineral is kept at a temperature of between 35 and 42° C. prior to filtering.

7. A method as set forth in claim 1, wherein the clay mineral contains bentonite.

8. A method as set forth in claim 7, wherein the bentonite is acid-activated.

9. A method as set forth in claim 1, wherein an amount of 0.25 to 10.0 percent by weight of clay mineral is added to the draining vegetable oil.

10. A method as set forth in claim 9, wherein an amount of 1.0 to 3.0 percent by weight of clay mineral is added to the draining vegetable oil.

11. A method as set forth in claim 1, wherein cellulosic additives are added to the draining vegetable oil.

12. A method as set forth in claim 1, wherein diatomaceous earth or additives containing diatomaceous earth are added to the draining vegetable oil.

13. A method as set forth in claim 1, wherein the draining vegetable oil exhibits a trub substance content of 2 to 30 percent by weight.

14. A method as set forth in claim 13, wherein the draining vegetable oil exhibits a trub substance content of 3 to 5 percent by weight.

15. A method as set forth in claim 13, wherein the amount of the added clay mineral is dependent on the trub substance content.

16. The method as set forth in claim 1, wherein the draining vegetable oil is filtered until the phosphorus content is reduced to less than 0.5 mg per kg of the resulting fuel.

17. A method as set forth in claim 1, wherein the filtered vegetable oil is recirculated to the draining oil and filtered again until its transparency reaches a prescribed threshold.

* * * * *